C. BRAMMING

ELECTRIC SWITCH

Dec. 9, 1930.

Re. 17,897

Original Filed March 1, 1928

INVENTOR.
CARL BRAMMING.

BY Goldsmith & Galt
ATTORNEYS.

Reissued Dec. 9, 1930 Re. 17,897

UNITED STATES PATENT OFFICE

CARL BRAMMING, OF CHICAGO, ILLINOIS, ASSIGNOR TO DELTA ELECTRIC COMPANY, OF MARION, INDIANA, A CORPORATION

ELECTRIC SWITCH

Original No. 1,740,535, dated December 24, 1929, Serial No. 258,271, filed March 1, 1928. Application for reissue filed October 20, 1930. Serial No. 490,041.

This invention relates to a double throw, one or two pole electric switch.

The principal object of this invention is to provide a switch of this character with a ball bearing slide, and recess for engaging with the ball bearing for checking the operation of the switch at the neutral point. By means of this arrangement, a more positive switch action is obtained, and it is given greater life by reason of the anti-frictional relationship of the sliding member and base.

The full nature of the invention will be more clearly understood from the accompanying drawings and the following description and claims:

Figure 1:
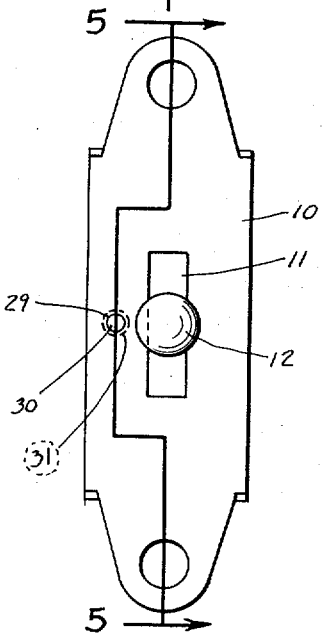
Fig. 1 is a front elevation of the switch.
Figure 2:
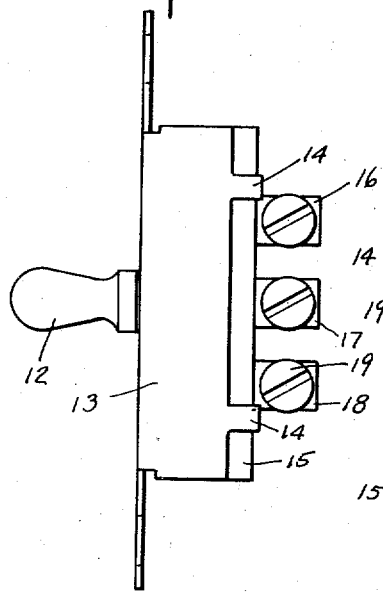
Fig. 2 is a side elevation thereof.
Figure 3:
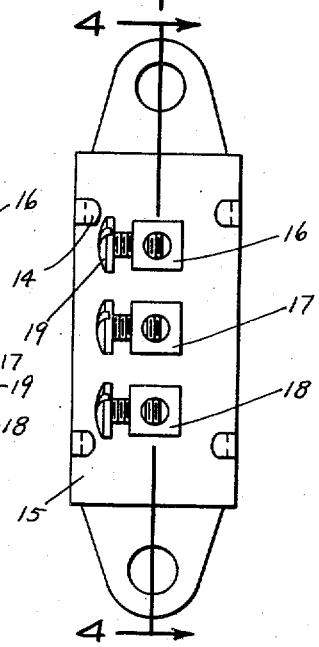
Fig. 3 is a rear elevation.
Figure 4:
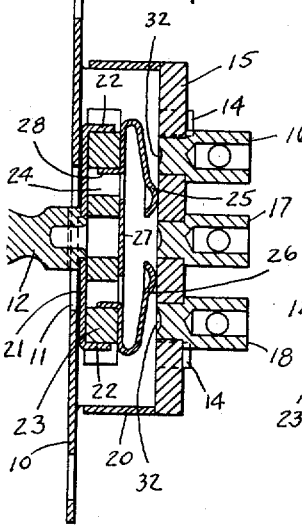
Fig. 4 is a section taken on the line 4—4 of Fig. 3 showing the switch in neutral position.

In the drawings, there is shown a switch having a face plate 10 provided with a longitudinal slot 11 in which the switch operating handle 12 is adapted to slide. Face plate 10 is provided with turned up sides 13 provided with clamps 14 for securing therebetween the contact supporting plate 15 formed of insulating material. Mounted in the plate 15 there are three connecting sockets 16, 17 and 18 provided with screws 19 for securing wire leads into the recesses formed therein.

Slidably mounted within the closure formed by the face plate, its sides 13 and the supporting plate 15, as well as the ends 20 formed from the sides 13, there is a contact carriage 21 having end plates 22 in which is positioned a contact block 23 provided with a plurality of recesses 24. The contact members 25 and 26 are formed at the free ends of the contact strip 27, said ends being bent inwardly toward each other as illustrated. Said strip is provided with downwardly extending ears 28 adapted to project in their corresponding recesses 24 so as to cause the contact members to be carried by the block 23. The handle 12 is secured to the carriage 21 so that upon sliding said handle longitudinally of the slot 11, it will cause said carriage , as well as the block 23 and contactors to slide longitudinally with respect to the supporting plate 15.

Figure 5:
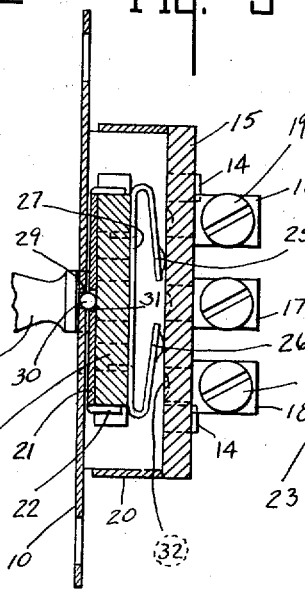
Fig. 5 is a section taken on the line 5—5 of Fig. 1 with the switch in neutral position.
Figure 6:
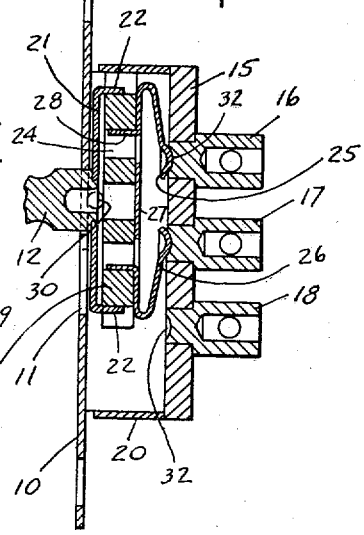
Fig. 6 is the same as Fig. 4 with the switch in contacting position.

The face plate 10 is provided with an opening or indentation therein as indicated at 29 in which the ball 30 is adapted to seat when brought into engagement therewith. Said ball is held in position by a suitable recess 31 formed in the carriage 21 so as to bear against the under surface of block 23. By this arrangement, when the carriage is moved from one position to another, the block 23 is slightly raised against the spring tension of the contactor, thus increasing the pressure between the contacting ends 25 and 26 thereof and their corresponding connector sockets, as illustrated in Fig. 6. When the switch is moved to neutral position as shown in Fig. 5, the ball 30 finds its seat in the hole 30 of the face plate, and is held therein by the tension of the contactor. Thus the movement of the switch is limited by the end of the slot 11 when in contacting position, and is held in its intermediate position by the engagement of the ball with the opening when in neutral position. It will be noted that the surface intermediate the recesses 32 of the connecting sockets is relatively smooth to permit free sliding action of the contactor ends 25 and 26 from one socket to the other.

The invention claimed is:

1. A switch of the character described, comprising a housing, a plurality of contact members mounted thereon, spring contactors adapted to engage and make contact therewith, a carriage for supporting said spring contactors, said carriage having an opening therein, a support upon which said carriage is adapted to slide having a recess therein and a ball bearing adapted to ride within the opening of said carriage in position to register with the recess in said support for resiliently holding said carriage in predetermined position under the spring tension of said spring contactors.

2. A switch of the character described, comprising a housing having a plurality of contact members, a carriage slidably mounted in said housing having a pair of spring contactors mounted thereon in position to yieldingly make contact with said members when in one position and be out of contact therewith when in a neutral position, and means associated with said carriage for maintaining it in position under spring tension when in neutral position, permitting it to be moved under increased spring tension into contacting position.

3. A switch of the character described, comprising a housing having a plurality of contact members, a carriage slidably mounted in said housing having a pair of spring contactors mounted thereon in position to yieldingly make contact with said members when in one position and be out of contact therewith when in a neutral position, a recess formed in said housing, and a ball bearing mounted in said carriage adapted to drop into said recess under tension of said spring contactors when moved to neutral position, and be forced out of said recess against the spring tension of the spring contactors for increasing the contacting pressure thereof when moved into contacting position.

4. A switch of the character described comprising a housing, a plurality of contact members mounted thereon, yielding spring contactors adapted to engage and make contact therewith, a block carried by said contactors and resiliently held in spaced relation from said contact members by resilient action thereon, a carriage in which said block is movably mounted with respect to said contact members, said carriage having an opening therein, a face plate with respect to which said carriage and block are adapted to slide having a recess therein, a ball bearing adapted to ride within the opening of said carriage in position to register with the recess in said plate when said carriage is moved to one position for interlocking said carriage and plate, and upon said carriage being moved to another position said ball will disengage the recess in said plate for spacing said block against the tension of said contactors from said carriage and thereby acting as a frictionless bearing intermediate said block and plate.

5. A three pole switch of the class described, comprising an elongated base of insulating material, three contact members embedded in the base each presenting a concave contacting surface flush therewith, a carriage adapted to slide along the base over the three contacts, a yieldable contactor carried by the carriage and engageable with adjacent contacts, and means associated with the carriage for holding the switch in neutral position and permitting it to be moved only under increased spring pressure.

6. A three pole switch of the class described, comprising an insulator base, three contact members embedded in the base and having concave ends flush with the inner surface of the base, a yieldable circuit closer adapted to close one circuit between adjacent contacts at one end of the switch throw, and another circuit between adjacent contacts at the other end of the throw, and means for holding the switch in neutral position permitting it to be moved under increased spring pressure.

7. In a switch of the class described, an insulator base, a plurality of contacts embedded in the base in longitudinal alinement, the inner ends of the contacts being concave and flush with the base, a carriage slidable along the base, a spring contactor mounted on the carriage and adapted to close a circuit between two or more contacts, and means associated with said carriage for maintaining it in position under spring tension when in neutral position permitting it to be moved under increased spring tension into contact position.

8. A three-pole switch of the character described, comprising a housing having three contact members in longitudinal alinement, a carriage slidably mounted in said housing having a pair of spring contactors mounted thereon in position to yieldably make contact with two of said members when in one position and to be out of contact therewith when in neutral position, and means associated with said carriage for maintaining it in position under spring tension when in neutral position, permitting it to be moved under increased spring tension into contact position.

In testimony whereof I affix my signature.

CARL BRAMMING.